United States Patent Office 3,534,016
Patented Oct. 13, 1970

3,534,016
LIQUID OR LOW-MELTING p-AMINOAZO DYES
Guenter Lange, Ludwigshafen (Rhine), Germany, assignor to Badische Anilin- & Soda-Fabrik, Aktiengesellschaft, Ludwigshafen (Rhine), Germany
No Drawing. Filed Nov. 1, 1966, Ser. No. 591,099
Claims priority, application Germany, Nov. 6, 1965, 1,544,386
Int. Cl. C07c 107/6, 107/8; C09b 29/06
U.S. Cl. 260—207.1                5 Claims

ABSTRACT OF THE DISCLOSURE

This invention relates to p-aminoazo dyes in which at least one of the nitrogen substituents bears an ester derived from a branched chain carboxylic acid of 7 to 12 carbon atoms, the dyes being especially useful for coloring gasoline, mineral oil and similar liquid to solid hydrocarbons.

For the dyeing of liquid or solid hydrocarbons, e.g. gasolines, mineral oils and candle materials dyes are required which have excellent solubility in the said substances. Azo dyes have been recommended for this purpose which, particularly in the coupling component, contain substituents that are known to increase solubility in the substances mentioned. Preferred substituents of this type are long-chain aliphatic and hydroaromatic cyclic radicals. The production of substituted azo dyes of the said kind is however very troublesome, as the melting points of the dyes are depressed by the presence of the said substituents so that greasy products are usually obtained under the conventional conditions of coupling which only crystallize to a minor extent and are extremely difficult to process.

It is an object of the present invention to provide dyes which, although being liquid or low-melting, are easy to prepare and lend themselves admirably to the dyeing of a great variety of substances such as gasoline, mineral oil, waxes and paraffins.

This object is achieved by low-melting or liquid p-aminoazo dyes that are free from ionic water-solubilizing groups and contain at least one aliphatic hydroxyl group esterified with an aliphatic carboxylic acid having from 7 to 16 carbon atoms.

p-Aminoazo dyes of the said kind contain, in addition to 1 to 3 esterified aliphatic hydroxyl groups, other non-ionic substituents usual in p-aminoazo dye chemistry, e.g. halogen atoms and nitro, alkyl, alkoxy, cyano, trifluoromethyl and alkylsulfonyl groups. Particularly suitable dyes are those of the general Formula I:

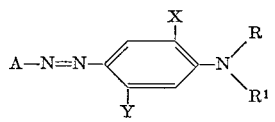

where A is the residue of a diazo component of the benzene, naphthalene or heterocyclic series, X is a hydrogen, chlorine or bromine atom or a low molecular weight alkyl or alkoxy group, Y is a hydrogen, chlorine or bromine atom, a low molecular weight alkyl or alkoxy group or an acylamino group having from 2 to 10 carbon atoms, one of the radicals R and R¹ is an alkyl, alkoxyalkyl, chloroalkyl, bromoalkyl, cyanoalkyl or acyloxyalkyl group or the radical of the formula

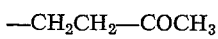

and the other is an acyloxyalkyl group, the acyl component of the acyloxyalkyl groups being derived from carboxylic acids having from 7 to 16 carbon atoms.

Those dyes are of particular importance industrially which have the general Formula II:

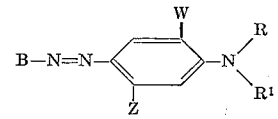

where B is the residue of a diazo component of the benzene, naphthalene, thiazole, thiadiazole, benzothiazole or isobenzothiazole series, W is a hydrogen atom or a methoxy or ethoxy group, Z is a hydrogen, chlorine or bromine atom or a methyl, ethyl or acylamino group having from 2 to 10 carbon atoms, one of the radicals R and R¹ is a methyl, ethyl, propyl, butyl, cyanoethyl, acyloxyethyl or acyloxypropyl group and the other is an acyloxyethyl, acyloxypropyl or diacyldioxypropyl group, the acyl components of the acyloxy radicals being derived from carboxylic acids having from 7 to 12 carbon atoms.

Examples of diazo components $BNH_2$ are: o-, m- and p-nitroaniline, 2-chloro-4-nitroaniline, 2,6 - dichloro-4-nitroaniline, 2,4,6 - trichloroaniline, 2,4 - dinitroaniline, 2-methylsulfonyl - 4 - nitroaniline, 2-cyano - 4 - nitroaniline, 2-cyano - 6 - chloro - 4 - nitroaniline, 2-bromo-4-nitroaniline, 2-trifluoromethyl-4-nitroaniline, 2-ethoxy-4-nitroanline, naphthylamine, 2 - amino - 6 - nitrobenzothiazole, 2-aminothiadiazole, 2-amino - 5 - phenylthiadiazole and aminoisobenzothiazole.

To produce the new dyes, p-aminoazo dyes containing esterifiable aliphatic hydroxyl groups are esterified with aliphatic carboxylic acids containing 7 to 16 carbon atoms. Although the aliphatic carboxylic acids may be straight-chained, they are preferably branched. It is advantageous to use monocarboxylic acids, of which those with 7 to 12 carbon atoms are preferred as giving esterification products of particularly good solubility. The use of mixtures of different carboxylic acids may have a beneficial effect on the desired solubility of the new dyes.

Examples of carboxylic acids that may be used as acyl components for the new dyes are caproic acid, valeric acid, ethylhexanoic acid, decanoic acid, undecanoic acid, dodecanoic acid, the branched-chain isomers of the said acids and mixtures of acids obtained by the oxidation of mixtures of paraffins having 5 to 14 carbon atoms.

The esterification of the hydroxyl groups with the carboxylic acids in the p-aminoazo dyes containing esterifiable hydroxyl groups is carried out by conventional methods in the presence or absence of solvents and with or without catalysts. Examples of suitable solvents are toluene, xylene, chlorobenzene, dimethyl formamide, N-methylpyrrolidone and dimethyl sulfoxide. A preferred procedure is to use an excess of the carboxylic acid component as the solvent. When using free carboxylic acids for esterification it is expedient to add acid catalysts, such as sulfuric acid, toluenesulfonic acid or boron trifluoride, and to use temperatures of approx. 50 to 200° C. Instead of the free acids it is possible to use their derivatives capable of esterifying hydroxy groups, e.g. anhydrides or acid halides, preferably together with some dimethyl formamide or pyridine. Examples of acid halides are particularly the chlorides and bromides.

In the production of the dyes according to this invention by transesterification it is expedient to start from carboxylic acid esters having low-boiling alcohol components, for example the methyl or ethyl esters. Transesterification is particularly successful in the presence of basic catalysts, e.g. alcoholates such as sodium methylate or titanium tetrabutylate.

It is advantageous to use for the esterification an at least stoichiometric amount of carboxylic acid or carboxylic acid derivative with reference to the number of reactive aliphatic hydroxyl groups present in the starting dye. As the new dyes are liquid or melt at temperatures only slightly above room temperature, the reaction products can be readily discharged from the reaction vessels, if desired after removal of any solvent or diluent and any excess amounts of acylating agent by distillation.

The new dyes are particularly convenient to handle owing to the fact that they are liquid. If their melting point is above room temperature, the dyes can be readily dissolved by adding small amounts of solvents, usually less than 50% by weight.

The new liquid or low-melting dyes have excellent solubility in most organic substances. They lend themselves admirably to the dyeing of gasolines, fuel oils, mineral oils, waxes, e.g. floor waxes, paraffins, etc. Owing to their very good solubility in monohydric and polyhydric alcohols, esters, ketones and ethers they are furthermore suitable for the production of transparent lacquers and varnishes, printing inks and ball print pen pastes. Polystyrene and polyvinyl chloride can also be dyed very fast shades. In addition to their excellent solubility the new dyes have good fastness to light and sublimation and very good fastness to water.

The invention is illustrated by, but not limited to, the following examples in which the parts specified are parts by weight.

EXAMPLE 1

5.7 parts of a dye obtained by coupling aniline with N,N-(β-dihydroxyethyl)aniline is suspended in 50 parts of toluene. 7 parts of the chloride of an aliphatic monocarboxylic acid having 9 carbon atoms (a mixture of isomers of different branched acids) is added and the whole heated under reflux, the dye passing into solution with esterification and liberation of hydrogen chloride. After esterification has been completed, which can usually be detected by thin-layer chromatography, residual portions of unreacted acid chloride and the toluene are preferably distilled off under a water-jet vacuum, 9.5 parts of a liquid yellow dye remains which is miscible in all proportions with ethyl alcohol, ethyl glycol, ethyl acetate, methyl ethyl ketone, white spirit, toluene and fuel oil.

EXAMPLE 2

20 parts of the dye obtainable by coupling diazotized 4-nitroaniline with N,N-(β-dihydroxyethyl)aniline is suspended in 80 parts of the methyl ester of a branched aliphatic monocarboxylic acid having 9 carbon atoms. 0.4 part of titanium tetra-n-butylate is added, the whole is heated to 160° to 170° C. while stirring and then an azeotropic mixture of carboxylic acid methyl ester and methanol is distilled off over a short column. In the course of approx. three hours the dye passes into solution with transesterification. The excess methyl ester is then distilled off under a water jet vacuum. 36 parts of a liquid orange yellow dye remains which has excellent solubility properties.

EXAMPLE 3

125 parts of the dye obtainable from diazotized 2-nitroaniline and N,N-(β-hydroxyethyl)-3-chloroaniline is introduced into 300 parts of 1,2-ethylhexanoic anhydride at about 100° to 120° C. Esterification is complete after stirring for approx. two hours at 120° C. A small amount of excess acid anhydride is distilled off under reduced pressure together with the ethylhexanoic acid formed. 220 parts of a liquid yellow dye remains which has outstanding solubility in all common organic solvents.

The dyes mentioned in the following table can be esterified by analogous methods:

| Example | Diazo component | Coupling component | Shade |
|---|---|---|---|
| 4 | 2,4-dinitro-6-bromoaniline | N,N-(β-dihydroxyethyl)-aniline | Red. |
| 5 | 3-nitroaniline | do | Yellow. |
| 6 | 4-nitroaniline | N,N-(β-dihydroxyethyl)-3-chloro-aniline | Orange. |
| 7 | 2-chloro-4-nitroaniline | N,N-(β-dihydroxyethyl)-3-methylaniline | Red. |
| 8 | 2-cyano-4-nitroaniline | N-butyl-N-β-hydroxyethylaniline | Red. |
| 9 | 2-chloro-4-nitroaniline | N-ethyl-N-β,γ-dihydroxypropylaniline | Scarlet. |
| 10 | 4-nitroaniline | N-β-cyanoethyl-N-β-hydroxyethylaniline | Orange. |
| 11 | 5-nitro-2-aminothiazole | 2-methoxy-5-acetylamino-N,N(β-hydroxyethyl)-aniline | Blue violet. |
| 12 | 2,4-dinitroaniline | N-n-butyl-N-β-hydroxy-propyl-m-toluidine | Red. |
| 13 | do | 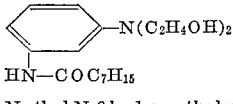 | Bluish red. |
| 14 | 2,4-dinitro-6-bromoaniline | N-ethyl-N-β-hydroxyethyl-m-toluidine | Violet. |
| 15 | 2-methoxy-4-nitroaniline | 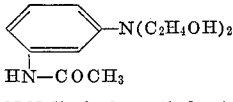 | Bluish red. |
| 16 | 2-methylsulfonyl-4-nitroaniline | N,N-di-β-hydroxyethyl-m-toluidine | Red. |
| 17 | 3-chloroaniline | N,N-di-β-hydroxyethylaniline | Yellow. |
| 18 | 4-acetylaminoaniline | do | Do. |
| 19 | 2-amino-6-methoxybenzothiazole | N-ethyl-N-β-hydroxypropyl-m-toluidine | Red. |
| 20 | 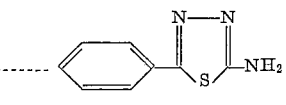 | 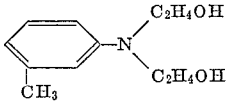 | Red. |
| 21 | 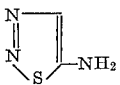 | do | Red. |
| 22 | 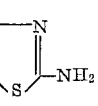 | do | Red. |
| 23 | 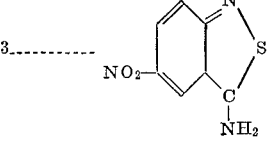 | do | Violet. |

| Example | Diazo component | Coupling component | Shade |
|---|---|---|---|
| 24 | 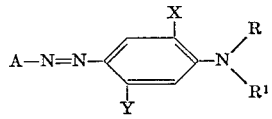 | do | Ruby. |
| 25 |  | do | Scarlet. |

20 parts of the dye obtainable from diazotized 2,4-dinitroaniline and N,N-(β-dihydroxyethyl)-3-methylaniline is introduced at approx. 100° to 120° C. into 20 parts of isobutyric anhydride. Esterification is complete after stirring for approx. two hours at 120° C. A small amount of excess acid anhydride is distilled off under vacuum together with the isobutyric acid formed. 30 parts of a liquid red dye is obtained which has outstanding solubility in all common organic solvents.

I claim:

1. A dye having the formula

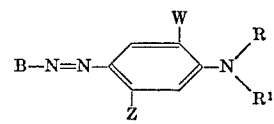

in which A represents the residue of a diazo component selected from the class consisting of the benzene series and naphthalene X denotes a member selected from the group consisting of hydrogen, methyl, ethyl, methoxy, chlorine and bromine, Y denotes a member selected from the group consisting of hydrogen, methyl, ethyl, methoxy, ethoxy, chlorine, bromine and alkanoylamino, the alkanoylamino radical having 2 to 10 carbon atoms, R denotes a member selected from the group consisting of alkyl, alkoxyalkyl, chloroalkyl, bromoalkyl, cyanoalkyl, alkanoyloxyalkyl, and the radical of the formula $$CH_3COCH_2CH_2-$$

wherein said alkyl and substituted alkyl radicals have one to four carbon atoms in the alkyl or alkylene radicals respectively, and $R^1$ denotes an alkanoyloxyalkyl group wherein the alkyl radical has 2 to 4 carbon atoms, the alkanoyl components of the said alkanoyloxyalkyl groups R and $R^1$ being derived from branched chain carboxylic acids having 7 to 12 carbon atoms.

2. A dye as claimed in claim 1 having the formula

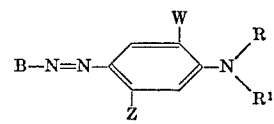

in which B denotes the residue of a diazo component of the benzene series, W denotes a member selected from the group consisting of hydrogen, methoxy and ethoxy, Z denotes a member selected from the group consisting of hydrogen, chlorine, bromine, methyl, ethyl and alkanoylamino where the alkanoylamino radical has 2 to 10 carbon atoms, R denotes a member selected from the group consisting of methyl, ethyl, propyl, butyl, cyanoethyl, alkanoyloxyethyl and alkanoyloxypropyl, $R^1$ denotes an alkanoyloxyethyl or alkanoyloxypropyl group, the alkanoyl components in the alkanoyloxy groups of R and $R^1$ being derived from a branched chain carboxylic acid having 8 carbon atoms.

3. The dye of the formula

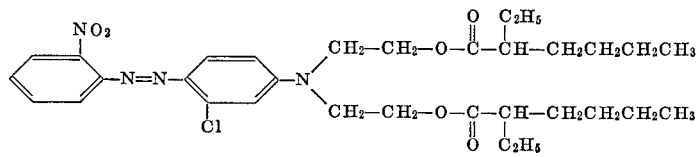

4. The dye of the formula

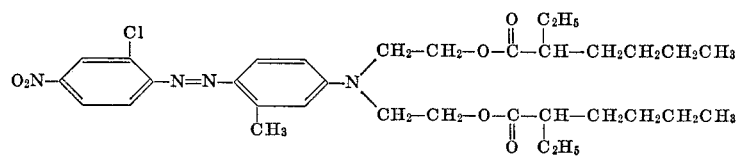

5. The dye of the formula

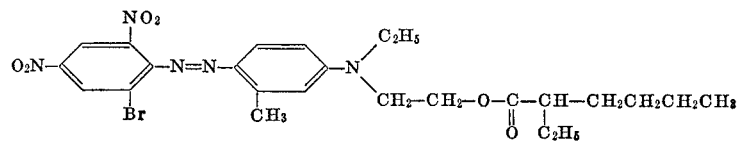

(References on following page)

References Cited

UNITED STATES PATENTS 2,891,942  6/1959  Merian _____ 260—207.1

FOREIGN PATENTS 612,125  11/1960  Italy.
887,416  1/1962  Great Britain.
910,306  11/1962  Great Britain.

CHARLES B. PARKER, Primary Examiner

C. F. WARREN, Assistant Examiner

U.S. Cl. X.R.

8—3, 4, 6; 44—7.5, 59; 106—22; 260—196, 207